United States Patent [19]

Blanc

[11] Patent Number: 4,807,422

[45] Date of Patent: Feb. 28, 1989

[54] APPARATUS FOR FILLING BOXES WITH OBJECTS NOTABLY FRUITS, FLOATING IN WATER

[75] Inventor: Philippe Blanc, Montauban, France

[73] Assignee: Societe Montalbanaise de Constructions Mecaniques, Montauban, France

[21] Appl. No.: 175,432

[22] Filed: Mar. 30, 1988

[51] Int. Cl.$^4$ .................. B65B 5/06; B65B 25/04; B65B 39/14

[52] U.S. Cl. .................................................. 53/248

[58] Field of Search ......................................... 53/248

[56] References Cited

U.S. PATENT DOCUMENTS

| | | | |
|---|---|---|---|
| 3,470,670 | 10/1969 | Gorin | 53/248 X |
| 3,550,347 | 12/1970 | Coates | 53/248 X |
| 3,643,400 | 2/1972 | Barbet | 53/248 |
| 3,656,272 | 4/1972 | Sheetz | 53/248 X |
| 3,694,996 | 10/1972 | Carlsen | 53/248 X |
| 4,051,645 | 10/1977 | Warkentin | 53/248 |

*Primary Examiner*—Robert L. Spruill
*Assistant Examiner*—Ann Tran
*Attorney, Agent, or Firm*—Pollock, Vande Sande & Priddy

[57] ABSTRACT

An apparatus for filling crates with objects, notably fruits, floating in water, which includes a tank filled with water, a crate which can be immersed inside said tank, feeding means for bringing the objects transported by the water in the crate, a water pump providing for the continuous circulation of water through the tank, the objects being distributed in the immersed crate until it is completely full, wherein the feeding means of the objects in the crate include a feeding channel and a cylindrical aperture formed in a massive plate, covering the upper portion of the crate, the upper portion of said plate being provided with profiled guides for channeling towards said cylindrical opening the objects floating on the liquid and incoming from the feeding channel.

9 Claims, 2 Drawing Sheets

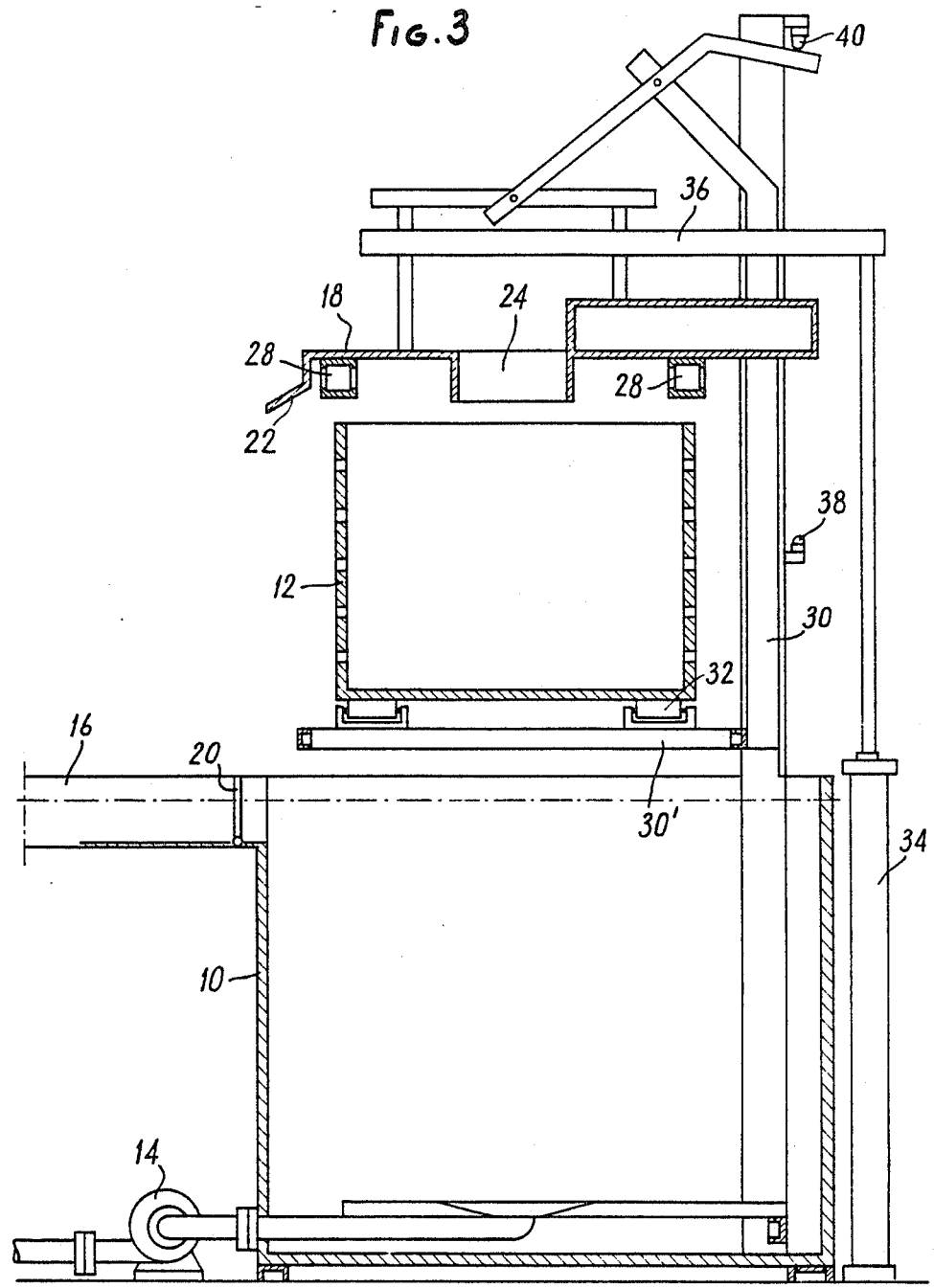

APPARATUS FOR FILLING BOXES WITH OBJECTS NOTABLY FRUITS, FLOATING IN WATER

FIELD OF THE INVENTION

The present invention relates to an apparatus for filling boxes with objects, notably fruits, floating on water. It is known that fruit transportation installations, notably of apples, allow filling boxes immersed in water.

The apparatus of this type presently known include generally a tank filled with water, in which a crate to be filled with fruits can be immersed. Said fruits, transported by a current of water, are conveyed via a feeding channel opening onto a chute which discharges its contents in the crate, at its upper portion. A water pump provides for the continuous circulation of the water, and the fruits are brought by the chute from a feeding channel to the inside of the crate in which they are distributed, until they fill said crate completely. There is provided a grid which covers the upper portion of the crate in order to force the fruit to remain inside the crate.

When the crate is completely full, a handling device provides for its removal from the tank, in order to replace it by an empty crate.

In such a known installation, it is necessary that the feeding channel be tapered so as to be connected to a chute opening into the immersed crate, this being the cause of a slowing down factor during the filling operation. The result of this arrangement is that the presently known and existing apparatus of the above type has a limited throughput.

OBJECT AND BACKGROUND OF THE INVENTION

The present invention aims at avoiding the disadvantages of the solutions of the hereabove cited technique by providing improvements thereto.

Consequently, the object of the present invention is an apparatus for filling crates with objects, notably fruits, floating in water, which includes a tank filled with water, a crate which can be immersed in the tank, means for bringing the objects transported by the water to said crate, and a pump providing for the continuous circulation of the water through said tank, the objects being distributed in the immersed crate until it is completely full, said apparatus being characterized in that the means for feeding the objects to said crate include a cylindrical opening provided in a massive plate covering the upper portion of the crate, the upper surface of the plate being provided with profiled guides for channeling the objects floating on the liquid and incoming from the feeding channel toward the cylindrical opening.

According to a feature of this invention, the dimensions of the massive plate correspond to the inner dimensions of the tank, and the plate is surrounded by a flexible seal ensuring a seal between its upper surface and its lower surface.

BRIEF DESCRIPTION OF THE DRAWINGS

Other features and advantages of this invention will become more apparent from the following description made with reference to the accompanying drawing, illustrating an embodiment having no limiting character. In the drawings:

FIG. 3 is a view similar to FIG. 1, showing the installation with a crate prior to the filling operation.

DETAILED DESCRIPTION OF THE INVENTION

Figure 2:
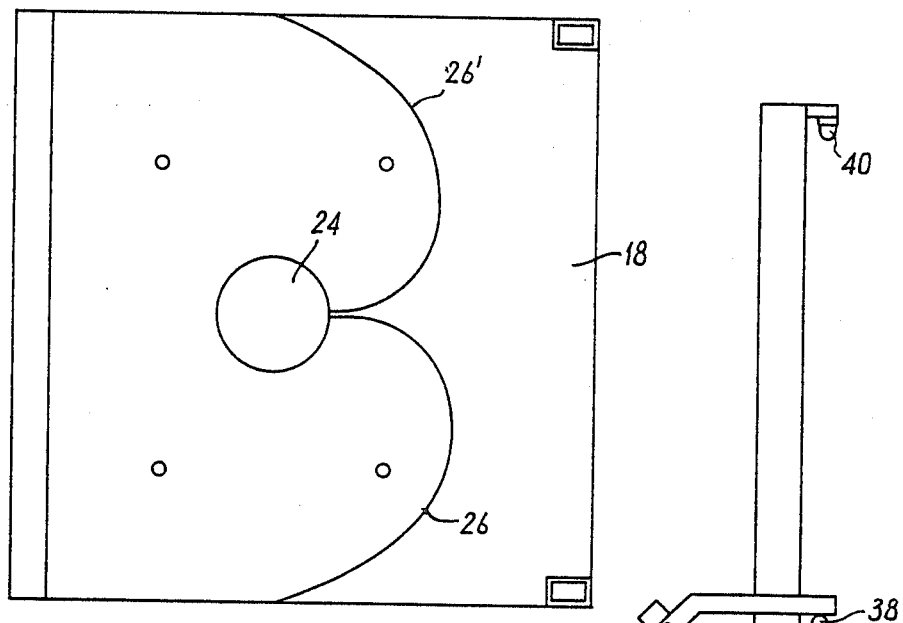
FIG. 2 is a plan view of the plate formed with a cylindrical opening and placed above the crate.

Referring to the drawings, one sees that the apparatus which is the object of the invention includes a tank, designated as a whole by reference numeral 10, inside which is immersed a crate 12 which has to be filled with objects, notably fruits, conveyed by a current of water. As will be described hereafter, crate 12 is provided with means which allow bringing it inside and outside tank 10.

The apparatus includes a feeding channel 16 which delivers the objects to be introduced inside crate 12 (here, they are fruits such as apples), said objects being conveyed by a current of water. According to the invention, the objects are introduced in crate 12 via a plate 18 which is formed with a circular aperture 24. On the upper surface of plate 18 are provided two guides 26, 26' having an arcuate profile so as to deflect and return the fruits conveyed by feeding channel 16 toward circular aperture 24. A water pump 14 provides for the inner circulation of the water through openings formed in crate 12, so as to ensure a flow of the liquid current transporting the fruits through the feeding opening 24.

The length and width dimensions of plate 18 correspond to the inner dimensions of the tank, said plate being surrounded by a flexible seal (not shown in the drawings) so as to ensure tightness between its upper and its lower surface.

Preferably, the profiled guides 26, 26' are equipped with a flexible material to avoid any damage to the fruits when said fruits, while being transported by the current of water, impinge on said guides in order to be directed toward the circular aperture 24 of plate 18.

The plate side which is turned toward feeding channel 16 is provided with a depending edge 22 ensuring the tightness starting from the bottom of channel 16, the height of said depending edge being such that tightness is obtained only from a certain position inside the tank.

Plate 18, formed with a feeding aperture 24, is provided on its periphery with perforated sections 28, positioned underneath its outer surface, so that the upper edges of the crate 12 can bear on said sections 28, thereby ensuring a liquid circulation between the crate and plate 18 while retaining the fruits inside box 12.

Figure 1:
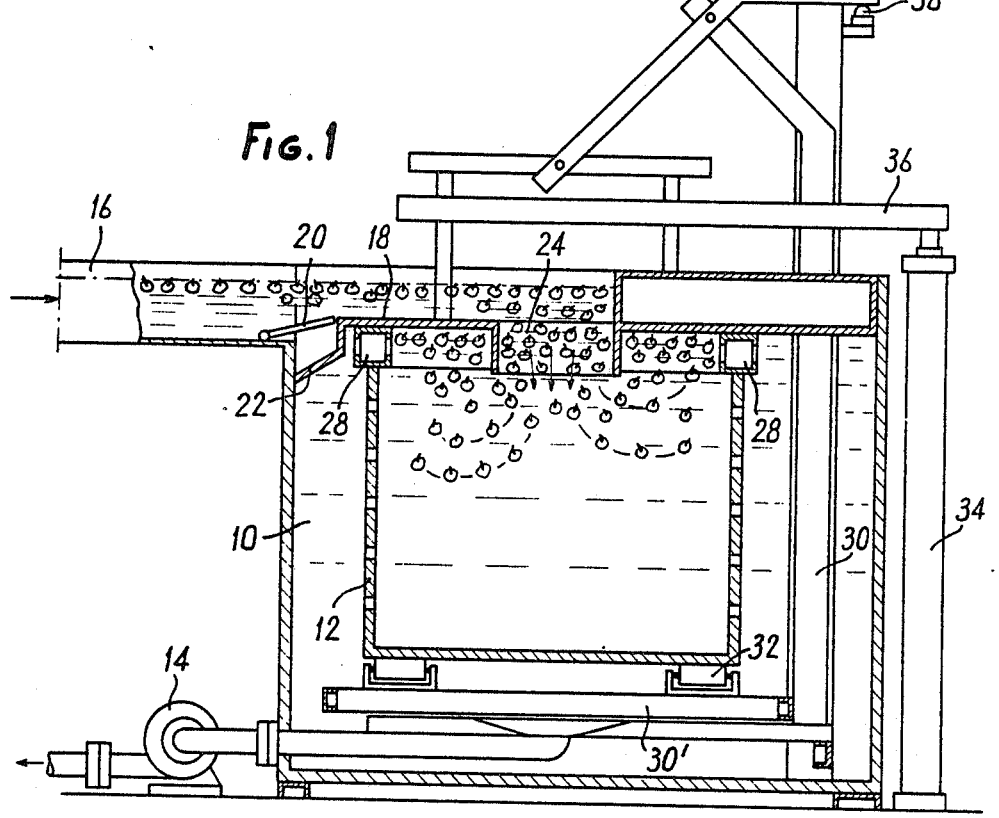
FIG. 1 shows in a vertical section an apparatus according to the invention with a crate being filled.

As can be seen from the drawing, the crate can be brought inside tank 10, in order to be filled with the fruits conveyed via channel 16, and can be extracted from said tank once it is full with the assistance of a lifting installation including a pedastal 30' which supports the crate via rollers, such as 32, said pedastal being rigidly connected to a telescopic column 30. Plate 18 and sections 28 are displaced via a bracket crane 36 moved by a jack 34. End of stroke abutments 38 and 40 allow control of the displacement of the crate and its cover between the discharge positions of the crate when full (FIG. 3) and the immersion of the crate inside the tank in order to be filled (FIG. 1). When the crate is outside tank 10, one can close feeding channel 16 via a mobile flap 20.

According to the invention, the position of the crate 12 and plate 18 assembly brought down inside tank 10, is made dependent on the liquid level in the tank so as to obtain the required thickness of liquid on plate 18 during filling.

When compared to the already known installations of the same type, the invention results in filling flow rates of the crates which are from two to three times higher than those previously obtained.

Of course, the present invention is not limited to the examples described and shown, and it encompasses all their variants.

What I claim is:

1. Apparatus for filling a crate with objects floating in water comprising a tank for containing water, a crate adapted for insertion into said tank, said crate having an open top, feeding means for bringing said objects suspended in water into said crate, and a water pump for circulating water through said tank, the improvement wherein said feeding means comprises:
   (a) a plate for covering said open top of said crate, said plate having an upper surface, a lower surface, and an aperture extending therethrough for passing of said objects from said upper surface into said crate;
   (b) an inlet channel for feeding said objects suspended in water to said upper surface of said plate;
   (c) an arcuate wall extending upwardly from said upper surface of said plate and aligned with said inlet channel to direct said objects floating in water above said upper surface to said aperture, whereby said objects pass through said aperture and into said crate.

2. Apparatus according to claim 1, wherein the dimensions of said plate correspond to the inner dimensions of the water filled tank.

3. Apparatus according to claim 1, wherein the side of said plate which faces said inlet channel is provided with a depending edge for ensuring water tightness from the channel bottom.

4. Apparatus according to claim 1, wherein said plate is provided with perforated sections underneath its lower surface so that the upper edges of said crate bear on said sections in order to ensure circulation of water between said crate and said plate while maintaining said fruits inside said crate.

5. Apparatus according to claim 1, wherein said arcuate wall is covered with a flexible material.

6. Apparatus according to claim 1, wherein means are provided for bringing the box inside said tank and for removing it therefrom after being filled with fruits.

7. Apparatus according to claim 1, wherein the position of the crate and plate inside said tank is dependent on the liquid level in the tank, so as to obtain the required depth of liquid during the filling operation.

8. Apparatus in accordance with claim 1 wherein said aperture is a circular aperture.

9. Apparatus in accordance with claim 1 wherein said arcuate wall comprises a pair of curved sections curving inwardly from opposite sides of said plate and meeting at a position on the border of said aperture which is most remote from said inlet channel.

* * * * *